United States Patent
Morris et al.

(10) Patent No.: US 7,800,694 B2
(45) Date of Patent: Sep. 21, 2010

(54) MODULAR GRID DISPLAY

(75) Inventors: Ronald Alan Morris, San Francisco, CA (US); David Hendler Sloo, Menlo Park, CA (US); Charles J. Migos, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1056 days.

(21) Appl. No.: 11/469,399

(22) Filed: Aug. 31, 2006

(65) Prior Publication Data
US 2008/0072252 A1 Mar. 20, 2008

(51) Int. Cl.
*H04N 5/46* (2006.01)

(52) U.S. Cl. .................. 348/556; 348/564; 725/43; 725/51

(58) Field of Classification Search ......... 348/552–570, 348/582, 588, 455; 725/37–61
See application file for complete search history.

(56) References Cited

U.S. PATENT DOCUMENTS

| | | | |
|---|---|---|---|
| 4,897,802 A | | 1/1990 | Atkinson et al. |
| 5,087,971 A | * | 2/1992 | Sakata et al. ............ 348/537 |
| 5,146,335 A | * | 9/1992 | Kim et al. .............. 348/564 |
| 5,294,989 A | | 3/1994 | Moore et al. |
| 5,365,276 A | * | 11/1994 | Imai et al. ............. 348/556 |
| 5,737,101 A | | 4/1998 | Ito |
| 5,926,568 A | | 7/1999 | Chaney et al. |
| 5,999,655 A | | 12/1999 | Kalker et al. |
| 6,625,310 B2 | | 9/2003 | Lipton et al. |
| 6,859,554 B2 | | 2/2005 | Porikli et al. |
| 6,927,801 B2 | * | 8/2005 | Yugami et al. .......... 348/458 |
| 2002/0110280 A1 | | 8/2002 | Prakash et al. |
| 2004/0223661 A1 | | 11/2004 | Kraft |
| 2006/0050959 A1 | | 3/2006 | Grady et al. |

OTHER PUBLICATIONS

Bauers, "Interaction Techniques for Large Digital Images: A Comparative Study", Master's paper for the M.S. in I.S. degree, Apr. 2003, 59 pages.
Bordoloi, et al., "Hardware Accelerated Interactive Vector Field Visualization: A Level of detail approach", Eurographics, vol. 21, No. 3, 2002, 10 pages.
Gourley, "Pattern Vector Based Reduction Of Large Multimodal Data Sets For Fixed Rate Interactivity During Visualization Of Multiresolution Models", Dissertation for the Doctor of Philosophy Degree, University of Tennessee, Dec. 1998, 182 pages.
Khella, et al., "Pocket PhotoMesa: A Zooming Image Browser for the Pocket PC", available at <<http://hcil.cs.umd.edu/trs/2004-20/2004-10.html>>, printed on May 8, 2006, 8 pages.

* cited by examiner

*Primary Examiner*—M. Lee
(74) *Attorney, Agent, or Firm*—Lee & Hayes, PLLC

(57) ABSTRACT

Modular grid display is described. In an embodiment, a modular grid includes grid elements that each have a display ratio which is adaptable to correspond to different aspect ratios of respective display devices via which media content can be displayed. One or more of the grid elements can be selected as a grid segment to position the media content for display via a display device such that the media content displays at the aspect ratio of the display device within the grid segment.

20 Claims, 6 Drawing Sheets

MODULAR GRID DISPLAY

BACKGROUND

Media content for television is produced in a multitude of formats, such as video standards NTSC, PAL, SECAM, and the like, which all have different, non-standard pixel aspect ratios. An aspect ratio of a television format is the proportional relationship between the width of a displayed image and the height of the displayed image. For example, movies are typically filmed with a camera having a 16:9 aspect ratio and are currently best viewed on a widescreen, high-definition television that also has a 16:9 aspect ratio. A typical television or computer display has a 4:3 aspect ratio which means that a television program is viewed as almost a square. When a 16:9 movie is displayed on a typical 4:3 television, the two sides of the movie are cut-off from being viewed. Alternatively, the competitors in a sports program designed for display on a typical 4:3 television will appear to be stretched out of proportion when viewed on a 16:9 widescreen television.

In addition to stretched or out of proportion sports viewing, overlaying graphics may be unreadable or off-screen altogether, such as a box score or the information banner for a baseball game that includes the score displayed at the top of the screen. Sporting events as well as other television programs are typically designed for the lowest common aspect ratio of a conventional 4:3 television because if not, viewers with a 4:3 aspect ratio display would not see all of the playing field and miss some of the action if the image were designed for a 16:9 aspect ratio. Consequently, viewers with widescreen televisions having a 16:9 aspect ratio have had to settle for a disproportionate view of many programs with images designed for a 4:3 aspect ratio display. Similarly, most viewers that watch movies filmed in a 16:9 aspect ratio on a typical 4:3 television miss the portions of the movie that are cut-off at the sides to be displayed on the typical standard definition television.

The non-standard aspect ratios of the multiple video standard formats are also a challenge to media content designers, such as for interactive television that can include various text, graphics, and images displayed over a television program. Typically, a designer has to scale and position the overlaying media content, such as for picture-in-picture, ticker banners, and the like, to display properly. Media content such as the text, graphics, images, and video are scaled and positioned to roughly approximate a television layout format, taking into account the display resolution, aspect ratio, and other factors to approximate a layout for the media content according to pixel positioning.

SUMMARY

This summary is provided to introduce simplified concepts of modular grid display which is further described below in the Detailed Description. This summary is not intended to identify essential features of the claimed subject matter, nor is it intended for use in determining the scope of the claimed subject matter.

In an embodiment of modular grid display, a modular grid includes grid elements that each have a display ratio which is adaptable to correspond to different aspect ratios of respective display devices via which media content can be displayed. One or more of the grid elements can be selected as a grid segment to position the media content for display via a display device such that the media content displays at the aspect ratio of the display device within the grid segment.

In other embodiment(s) of modular grid display, additional media content can be received for display via the display device, and an additional grid segment of the one or more grid elements can be selected to position the additional media content for display. The additional media content can be displayed proximate the media content, and such that the additional media content displays at the aspect ratio of the display device within the additional grid segment. The additional media content can be displayed proximate the media content as a picture-in-picture, over at least a portion of the media content, adjacent the media content on the same display device, and/or the like.

In other embodiment(s) of modular grid display, the grid segment of the one or more grid elements can be selected by a content provider of the media content that delivers the media content to client devices which receive and render the media content for display within the grid segment. Alternatively, the grid segment can be selected by a client device and/or by a media content designer to position the media content for display via the display device such that the media content displays at the aspect ratio of the display device within the grid segment.

BRIEF DESCRIPTION OF THE DRAWINGS

The same numbers are used throughout the drawings to reference like features and components.

DETAILED DESCRIPTION

Modular grid display is described in which embodiments provide that media content can be positioned for display on a display device with a modular grid that includes grid elements which are adaptable to the different aspect ratios of various display devices via which the media content can be displayed. Any number of the grid elements can be combined into a grid segment that has the same general horizontal and vertical size ratio as the display device via which the media content is displayed. For example, media content can be positioned for display within the modular grid on a standard definition television and on a high-definition widescreen display, and the media content will display in the selected grid element(s) and/or grid segment in the same relative position on both the television and the display.

Various media content, such as video, text, images, graphics, tickers, and the like, can be positioned for display using the modular grid for an interactive layout on a television or display, irrespective of the television format or technology. A designer of the interactive layout can simply specify a grid coordinate to position the media content for display, rather than having to specifically identify pixel offsets in a horizontal and vertical direction for each different television format.

As such, the various media content can be accurately positioned in a "snap-to-grid" manner which can be standardized across the multitude of television formats. Modular grid display separates the design space from the display resolution.

While aspects of the described systems and methods for modular grid display can be implemented in any number of different computing systems, environments, entertainment systems, and/or configurations, embodiments of modular grid display are described in the context of the following example systems and environments.

Figure 1:
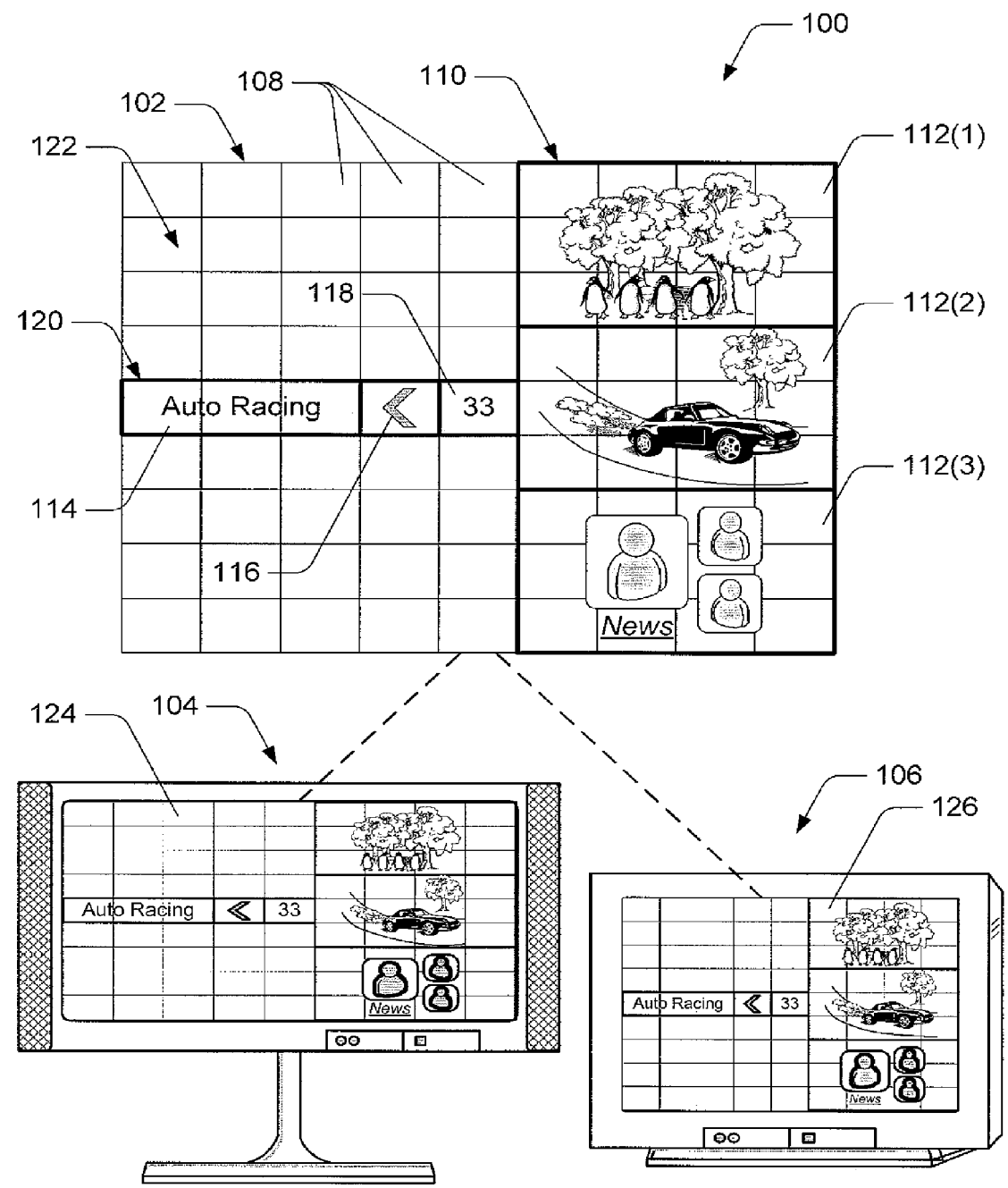
FIG. 1 illustrates an example environment in which embodiments of modular grid display can be implemented.

FIG. 1 illustrates an example modular grid display environment 100 in which embodiments of modular grid display can be implemented. The environment 100 includes a modular grid 102, an example of a widescreen high-definition display device 104 having a 16:9 aspect ratio, and an example of a standard-definition display device 106 having a 4:3 aspect ratio. In this example, the modular grid 102 is illustrated as a nine-by-nine grid of multiple grid elements 108, but could be implemented with any number of grid elements, such as an eight-by-eight grid or as more grid elements within the same framework for more accurate and/or precise positioning of media content. It should be appreciated that modular grid display separates the design space of the grid from the display resolution, where a grid element can include any number of pixels.

Media content such as any text, image, graphic, picture-in-picture, video, and the like can positioned within the modular grid 102 by specifying one or a group of the grid elements 108 in which to display the media content. One or more of the grid elements can be selected as a grid segment to position media content for display via a display device. In this example, a program guide 110 includes images of selectable programs each displayed within grid segments 112(1-3) which are each a group of four-by-three grid elements 108. The program guide 110 can include or be associated with any of a menu text 114, a navigation indicator 1165, and a program channel number 118 each of which is positioned in the modular grid 102 within a grid segment of grid elements 108. The menu text 114, for example, is positioned in the modular grid 102 within grid segment 120 which is three-by-one grid elements. The navigation indicator 116 and the program channel number 118 are each positioned in the modular grid 102 within grid segments that each include only one grid element. Although not shown, media content (e.g., a full-screen video) can be displayed in the background 122 with the program guide 110 overlaid for display.

Media content can include television-based programs (or programming) which may be any form of programs, commercials, music, movies, and on-demand media content. Other media content can include recorded media content, interactive games, network-based applications, and any other audio, video, and/or image content. In addition, media content in general may include music streamed from a computing device to a client device, such as a set-top box, and may also include on-demand media content delivered from a server, and any other audio, video, and/or image content received from any type of media content source.

Each of the grid elements 108 have a display ratio which is adaptable to correspond to different aspect ratios of various display devices via which media content can be displayed. The modular grid 102 can be adapted to display the various media content on the widescreen display device 104 having the 16:9 aspect ratio, and can be adapted to display the various media content on the display device 106 having the 4:3 aspect ratio such that the media content displays at the aspect ratio of the particular display device within the modular grid 102. For example, the grid elements 108 in the modular grid 124 shown displayed on the widescreen display device 104 each have a 16:9 display ratio that corresponds to the 16:9 aspect ratio of the widescreen display device 104. Similarly, the grid elements 108 in the modular grid 126 shown displayed on the display device 106 each have a 4:3 display ratio that corresponds to the 4:3 aspect ratio of the display device 106.

The display ratio of the grid elements 108 are adapted to correspond to the various aspect ratios of the different display devices (e.g., display devices 104, 106) such that the grid elements are the same proportion as the screen. In an embodiment, a client device, such as a television set-top box, can determine the aspect ratio of an associated display device and adapt the display ratio of the grid elements 108 accordingly.

The client device can automatically determine the aspect ratio, or receive a user-selectable input via a settings selection interface. The fonts and images are not stretched or scaled as with conventional high-definition televisions and displays that scale the output and distort the aspect ratio of images, video, and text to fit the screen. Rather, for modular grid display, there is a corresponding, pre-determined font size for any given screen size such that fonts will wrap differently for the various sized displays. Additionally, appropriate sized images are downloaded based on the resolution of a display device rather than scaling the images and distorting them.

Although the modular grid 102 is shown as modular grids 124, 126 on the respective display devices 104, 106, all or portions of the modular grids may not actually be displayed when the media content is displayed for viewing. The modular grids 124, 126 are shown on the display devices merely to illustrate embodiment(s) of modular grid display.

The grid segments 112(1-3) and 120 of the one or more grid elements 108 can be selected by a content provider of the media content that communicates the media content to client devices which receive and render the media content for display within the grid segment. Alternatively, the grid segments can be selected by a client device that receives the media content and/or by a media content designer to position the media content in the design space for display via a display device such that the media content displays at the aspect ratio of the display device within the grid segment.

Figure 2:
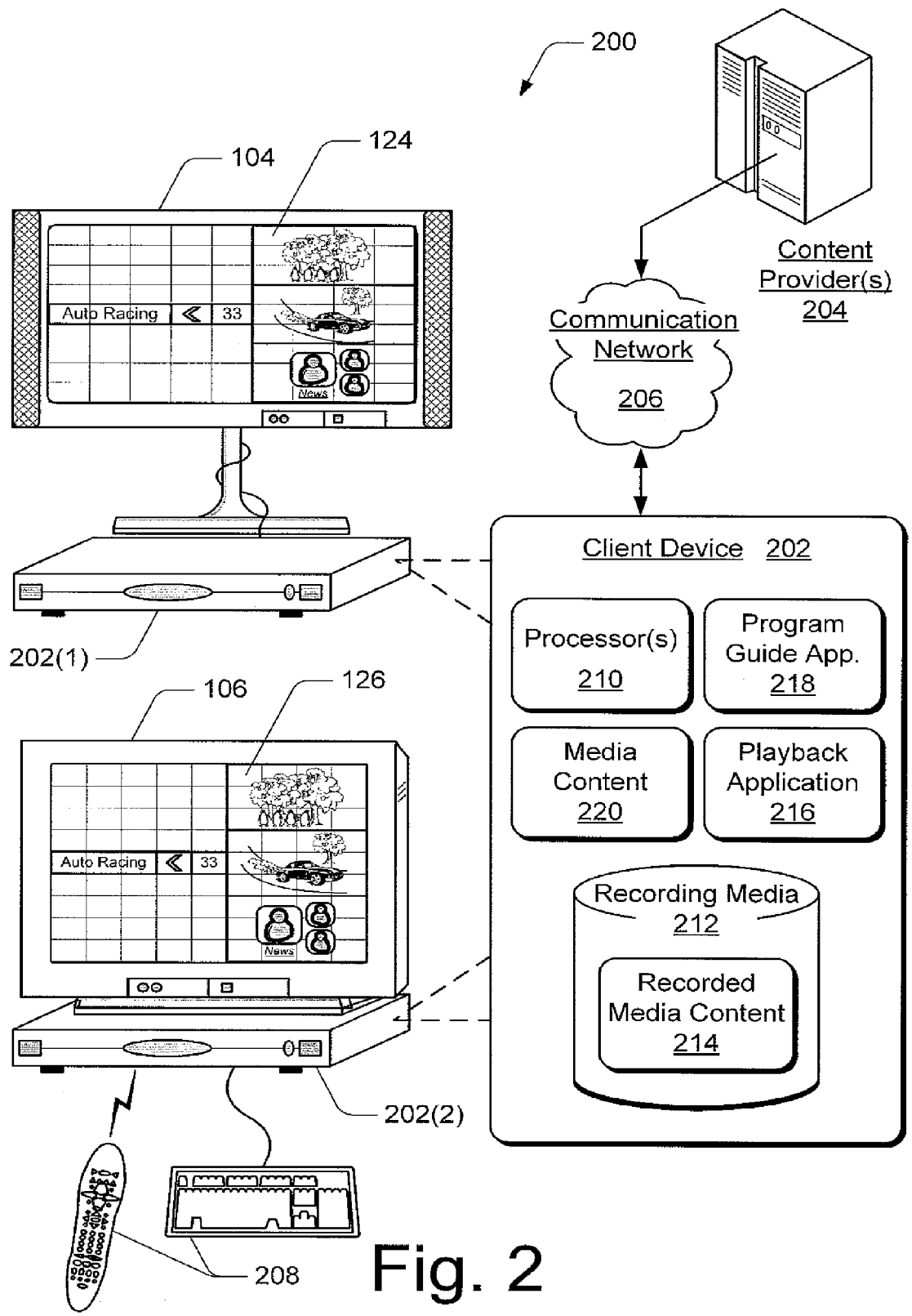
FIG. 2 illustrates an example system in which embodiments of modular grid display can be implemented.

FIG. 2 illustrates an example modular grid display system 200 in which embodiments of modular grid display can be implemented. The system 200 includes client devices 202(1-2), content provider(s) 204, a communication network 206, and input devices 208, such as a remote control device and a computer keyboard. The client devices 202(1-2) each have an associated display device, such as display devices 104, 106 described with reference to FIG. 1. The display devices 104, 106 can be any type of television, LCD (such as a hand held device, cellular telephone, computer display, etc.), or any other television-based display system that renders audio, video, and/or image data. A client device and display device together are but one example of a client system, examples of which are described with reference to the example IP-based television (IPTV) system shown in FIG. 4, and with reference to the example entertainment and information system shown in FIG. 6.

The client devices 202(1-2) can be implemented in any number of embodiments, such as a set-top box, a digital video recorder (DVR) and playback system, an appliance device, a gaming device, and as any other type of client device that may be implemented in an entertainment and information system. In this example, a client device 202 includes one or more processor(s) 210, recording media 212 that maintains recorded media content 214, a playback application 216, and a program guide application 218 which can be implemented as computer executable instructions and executed by the processor(s) 210 to implement embodiments of modular grid display. For example, the program guide application 218 can include a process, function, etc. that determines the aspect ratio of an associated display device such that the display ratio of the grid elements 108 are adapted accordingly. Additionally, client device 202 may be implemented with any number and combination of differing components as further described below with reference to the example client device shown in FIG. 5.

Recording media 212 along with the playback application 216 can be implemented as a DVR system to record and maintain the recorded media content 214 which may be any form of on-demand and/or broadcast media content 220 such as programs, movies, commercials, music, and similar audio, video, and/or image content that client device 202 receives and/or records. The playback application 216 is a video control application that, in this example, can be implemented to control the playback of media content 220, the recorded media content 214, and or other video on-demand media content, music, and any other audio, video, and/or image media content which can be rendered and/or displayed for viewing on a display device 104, 106, such as the program guide 110 positioned for display within a modular grid 124, 126.

The client devices 202(1-2) are configured for communication with the content provider(s) 204 via the communication network 2065, which in this example, is an IP-based network. The client devices 202(1-2) receive programs, associated program content, various forms of media content, program guide data, advertising content, and other media content from content server(s) of the content provider(s) 204 via the IP-based network 206.

Any of the systems and/or devices can be configured for network access in any number of embodiments and varieties of implementation. The communication network 206 can be implemented as any one or combination of a wide area network (e.g., the Internet), a local area network (LAN), an intranet, an IP-based network, broadcast network, a public telephone network, a wireless network, or other media content distribution network. Additionally, communication network 206 can be implemented using any type of network topology and any network communication protocol, and can be represented or otherwise implemented as a combination of two or more networks.

Generally, any of the functions and methods described herein can be implemented using hardware, software, firmware (e.g., fixed logic circuitry), manual processing, or any combination thereof. A software implementation represents program code that performs specified tasks when executed on a computing-based processor. Example method 300 described with reference to FIG. 3 may be described in the general context of computer executable instructions. Generally, computer executable instructions can include applications, routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices. Further, the features described herein are platform-independent such that the techniques may be implemented on a variety of computing platforms having a variety of processors.

Figure 3:
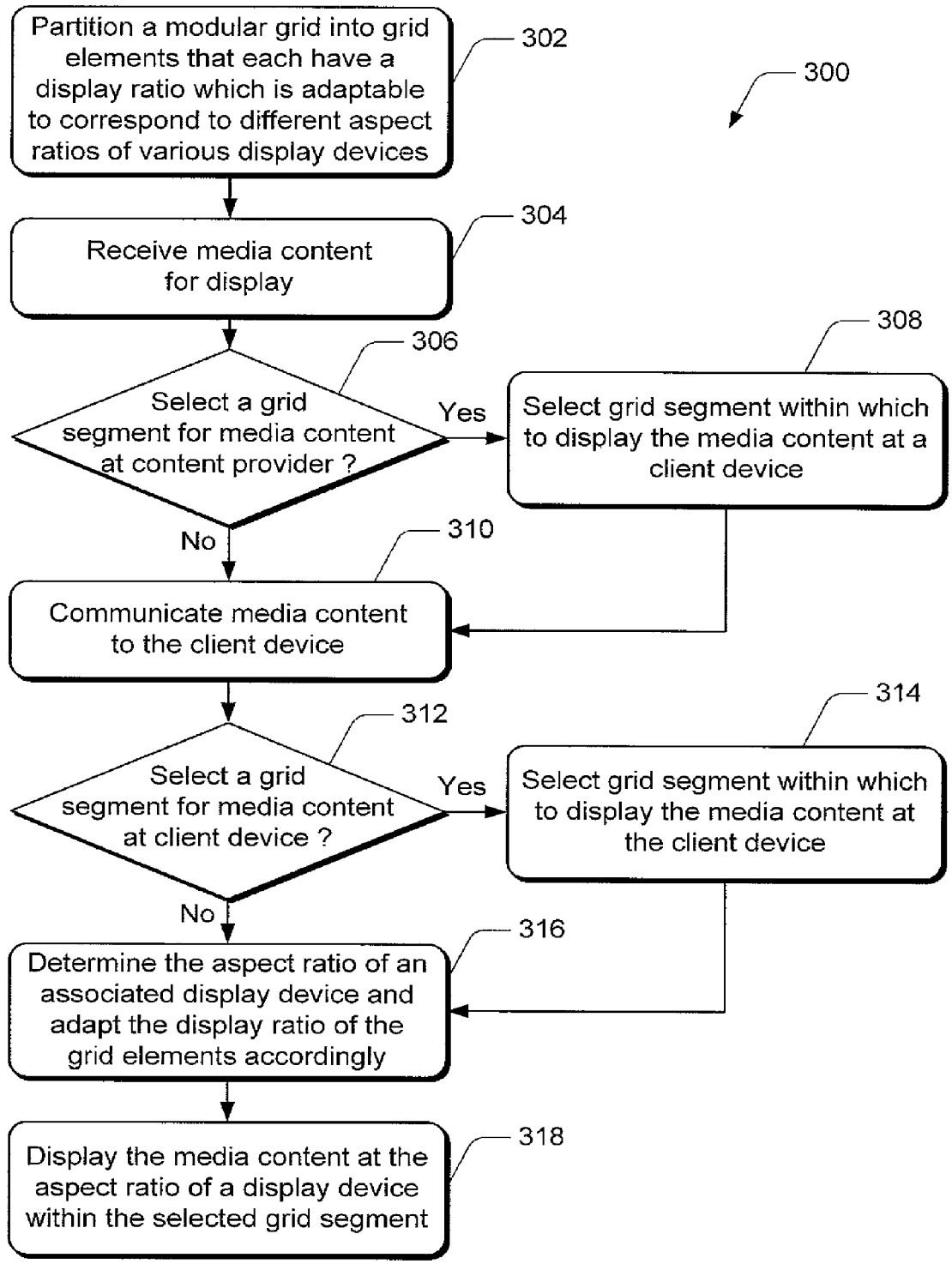
FIG. 3 illustrates example method(s) for modular grid display.

FIG. 3 illustrates an example method 300 for modular grid display and is described with reference to the example environment shown in FIG. 1 and with reference to the example system shown in FIG. 2. The order in which the method is described is not intended to be construed as a limitation, and any number of the described method blocks can be combined in any order to implement the method, or an alternate method.

At block 302, a modular grid is partitioned into grid elements that each have a display ratio which is adaptable to correspond to different aspect ratios of various display devices. For example, modular grid 102 is partitioned into grid elements 108 that each have a display ratio which is adaptable to correspond to the different aspect ratios of the display devices 104, 106. At block 304, media content is received for display. For example, the content provider(s) 204 receive media content from various content sources that provide the media content for distribution to customers or subscribers that have client devices, such as television set-top boxes.

At block 306, a determination is made as to whether a grid segment is to be selected at a content provider. The media content, such as any text, image, graphic, picture-in-picture, and the like can positioned within the modular grid 102 by selecting a grid segment in which to display the media content. One or a group of the grid elements 108 can be selected as a grid segment to position the media content for display. In an embodiment, the grid segment may be selected by a designer of the media content prior to a content provider receiving the media content for distribution (e.g., at block 304). However, the grid segment or a different grid segment can be selected at the content provider 204 to position or re-position the media content for display.

If the grid segment is to be selected by the content provider (i.e., "yes" from block 306), then at block 308, the grid segment is selected within which to display the media content via a display device at a client device. In one example, the grid segment can be selected to include all of the grid elements 108 of the modular grid 102 such that the media content displays full-screen on a display device. If the grid segment is not selected by the content provider (i.e., "no" from block 306), or if the grid segment is selected at block 308, then the media content is communicated to the client device at block 310. For example, the content provider(s) 204 communicate the media content (with the selected grid segment(s) data if selected at block 306) to the client devices 202(1-2) via the communication network 206.

At block 312, a determination is made as to whether the grid segment is to be selected at a client device. As described above, the grid segment may be selected by a designer of the media content prior to a content provider receiving the media content, or the grid segment may be selected at the content provider at block 308. However, the grid segment or a different grid segment can be selected at a client device 202 to position or re-position the media content for display.

If the grid segment is selected by the client device (i.e., "yes" from block 312), then at block 314, the grid segment is selected within which to display the media content via a display device associated with the client device. The client device 202 can maintain the grid element, grid segment, and/or selected user preferences that are received or determined at the client device. If the grid segment is not selected by the client device (i.e., "no" from block 312), or if the grid segment is selected at block 314, then the aspect ratio of the associated display device is determined and the display ratio of the grid elements are adapted accordingly at block 316. The display ratio of the grid elements 108 are adapted to correspond to the various aspect ratios of the different display devices (e.g., display devices 104, 106) such that the grid elements are the same proportion as the display screen. For example, the client device 202 can determine the aspect ratio of an associated display device and adapt the display ratio of the grid elements 108 accordingly. The media content is then displayed at the aspect ratio of the display device and within the selected grid segment at block 318.

The method 300 can then continue at block 304 to receive additional media content for display via a display device. An additional grid segment of the one or more grid elements can be selected at blocks 306 and/or 312 to position the additional media content for display such that the additional media content is displayed proximate the media content, and such that the additional media content displays at the aspect ratio of the display device within the additional grid segment. The additional media content can be displayed proximate the media content as a picture-in-picture, over a portion of the media content and/or adjacent the media content.

Figure 4:
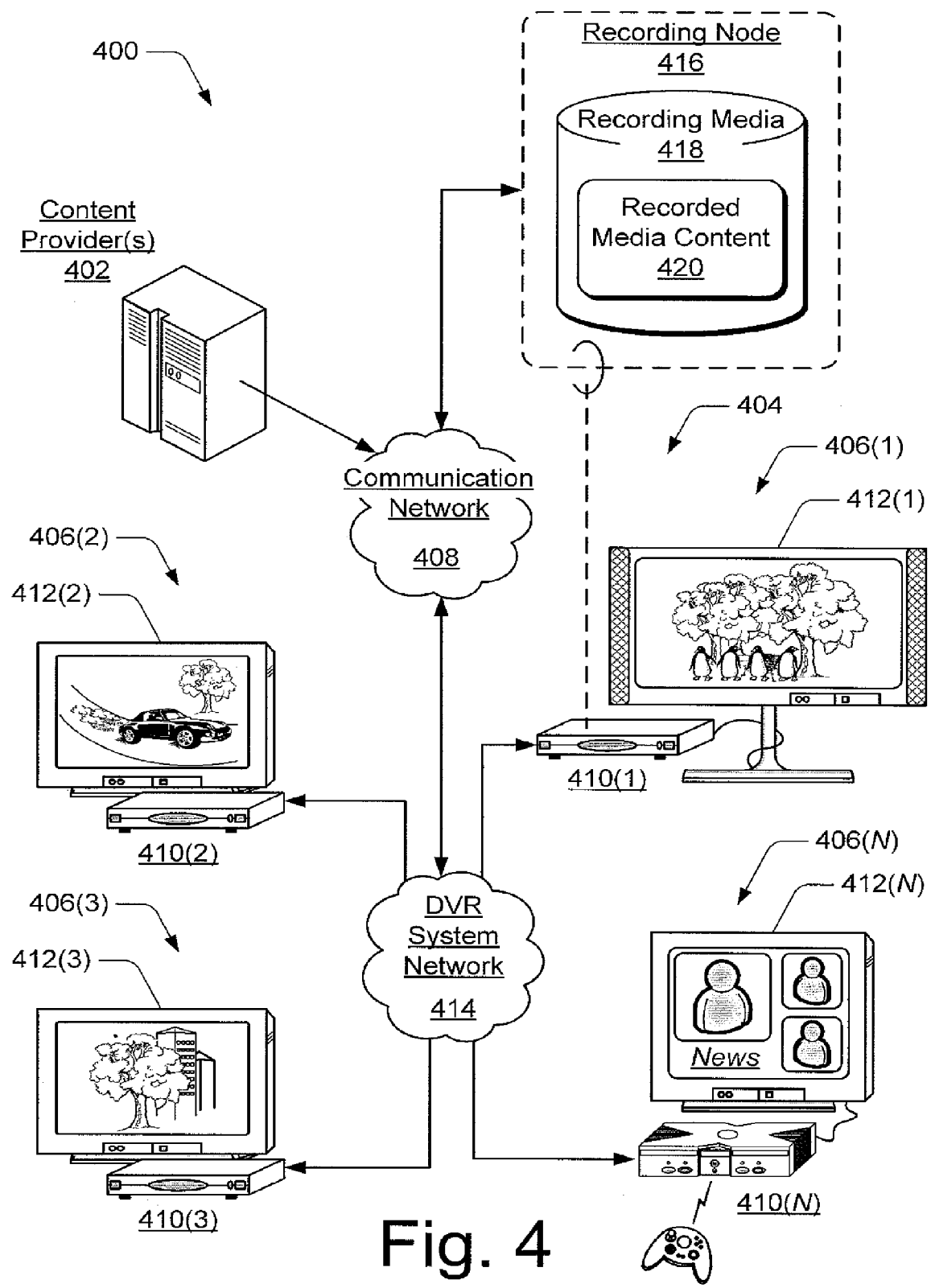
FIG. 4 illustrates an example IP-based television (IPTV) system in which embodiments of modular grid display can be implemented.

FIG. 4 illustrates an example IP-based television (IPTV) environment 400 in which embodiments of modular grid display can be implemented. The IPTV environment 400 includes content provider(s) 402 and a multi-DVR system 404 that can include any number of client systems 406(1-N). The multi-DVR system 404 can represent a household viewing system that has several viewing areas, such as different rooms, for viewing television programs. The multi-DVR system 404 is configured for communication with any number of the different content provider(s) 402 via a communication network 408 which, in this example, is an IP-based network. Any of the systems and/or devices can be configured for network access in any number of embodiments and varieties of implementation.

The client systems 406(1-N) of the multi-DVR system 404 are representative of DVR nodes in a multi-DVR system. Each of the DVR nodes of the multi-DVR system 404 can communicate with each other to act and make decisions on behalf of the other nodes, for the overall common good of the multi-DVR system 404, and based on the state of individual nodes and/or based on the state of the multi-DVR system 404.

The client system 4065(1) includes a client device 410(1) and a display device 412(1), such as any type of television, monitor, LCD, or other display system that together renders audio, video, and/or image data. Similarly, the client systems 406(2-N) each include a respective client device 410(2-N) and a respective display device 412(2-N). Each of the client devices 406(1-N) can receive media content and determine the aspect ratio of the associated display device 412(1-N) to adapt the display ratio of the grid elements such that the media content displays within grid elements that are of the same proportion as the display screen.

Each client device 410 can be implemented in any number of embodiments, such as a television-based set-top box, a digital video recorder (DVR) and playback system, an appliance device, a gaming system such as client device 410(N), a computing-based device, and as any other type of client device that may be implemented in a entertainment and information system. A client device at a node of the multi-DVR system 404 may also be associated with a user (i.e., a person) and/or an entity that operates a client device such that the client devices describe logical clients that include users, software, and/or devices.

The client systems 406(1-N) can be implemented for communication with each other via a DVR system network 414, and may be implemented with any number and combination of differing components as further described below with reference to the example client device shown in FIG. 5. As a client device, a node of the multi-DVR system 404 can be implemented with one or more processors, a communication module, memory components, a program guide application, and a content rendering system which can be implemented as computer executable instructions and executed by the processor(s) to implement embodiments of modular grid display. Further, the IPTV environment 400 may be implemented with any number and combination of differing components as described below with reference to the example entertainment and information system shown in FIG. 6.

A client system 406 at a node of the multi-DVR system 404 can receive programs, associated program content various forms of media content, program guide data, advertising content, and other types of media content from content server(s) of the content provider(s) 402 via the communication network 408. Media content can include television-based programs (or programming) which may be any form of programs, commercials, music, movies, and video on-demand movies. Other media content can include recorded media content, interactive games, network-based applications, and any other similar audio, video, and/or image content. In addition, media content in general may include music streamed from a computing device to a client device, such as a television-based set-top box, and may also include video on-demand media content delivered from a server, a photo slideshow, and any other audio, video, and/or image content received from any type of media content source.

Although the data streams are not shown specifically, the arrowed communication links illustrate various data communication links which include the data streams. Additionally, the arrowed communication links are not intended to be interpreted as a one-way communication link from the DVR system network 414 to a client device 410(1), for example. It is contemplated that any one or more of the arrowed communication links can facilitate two-way data communication, such as from communication network 408 to a content provider 402.

The multi-DVR system 404 includes a recording node 416 which includes recording media 418 to maintain recorded media 420. In an embodiment, any one or more of the client devices 410(1-N) in the multi-DVR system 404 can be implemented as the recording node 416 (as shown by the dashed line) which includes the recording media 418 to record media content 420 received from a content provider 402. Alternatively (or in addition), a recording node of the multi-DVR system 404 can be implemented as a network-based recording node that the multi-DVR system 404 can communicate with via the communication network 408. In another implementation, the recording node 416 can be an independent component of the multi-DVR system 404.

The recording node 416 can record media content with the recording media 418 for any one or more of the client devices 410(1-N) of the multi-DVR system 404. For example, a client device 410 can initiate a record request to have media content recorded for a scheduled recording or to record and provide a pause buffer for the client device. The recording node 416 can receive the record request and record the media content such that the client device can access and render the recorded media content from the recording node via the DVR system network 414 and/or the communication network 408.

Figure 5:
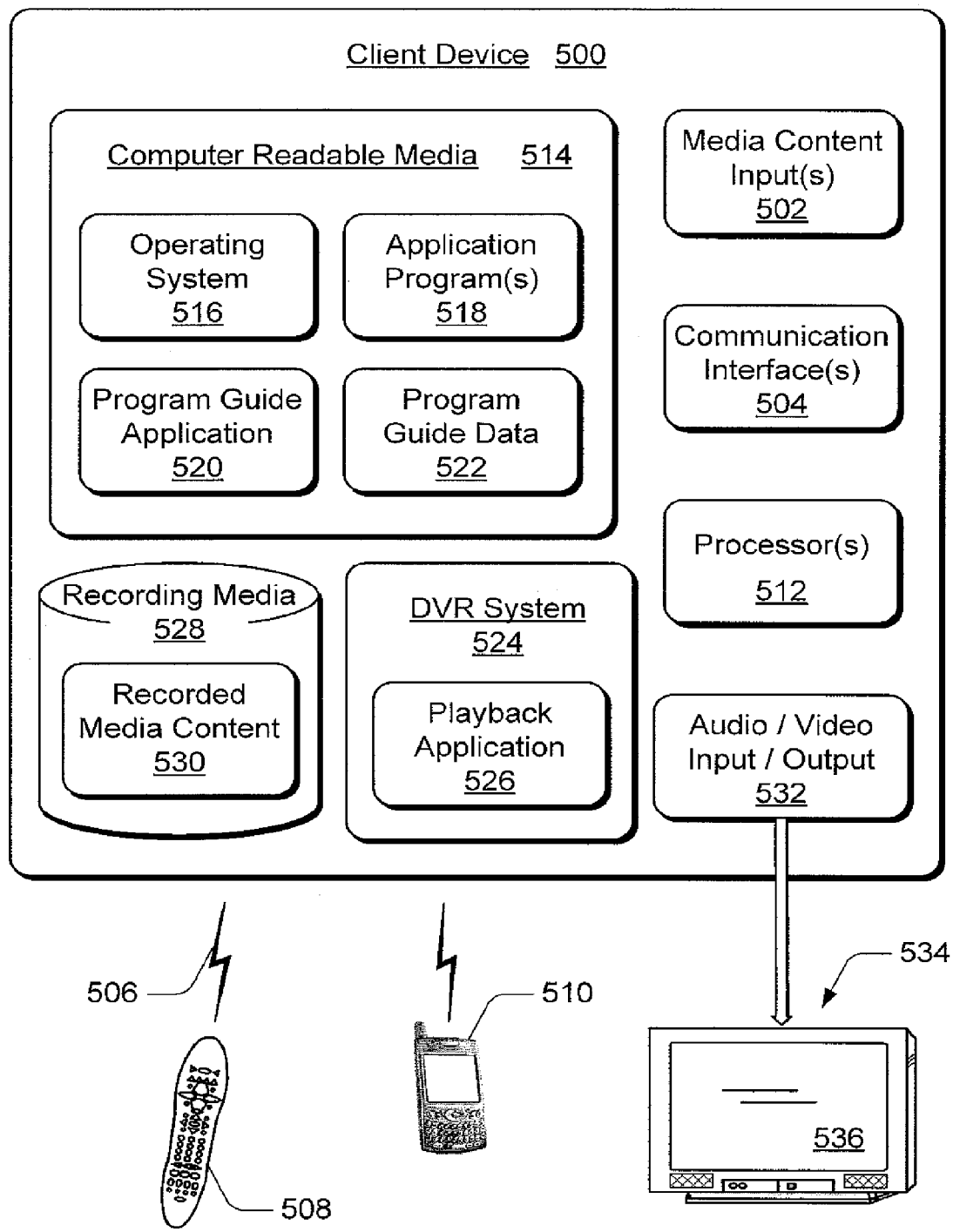
FIG. 5 illustrates various components of an example client device in which embodiments of modular grid display can be implemented.

FIG. 5 illustrates various components of an example client device 500 which can be implemented as any form of a computing, electronic, or client device in which embodiments of modular grid display can be implemented. For example, the client device 500 can be implemented as a client device, such as a set-top box, at a DVR node of the multi-DVR system shown in FIG. 4.

Client device 500 includes one or more media content inputs 502 which may include Internet Protocol (IP) inputs over which streams of media content are received via an IP-based network. Device 500 further includes communication interface(s) 504 which can be implemented as any one or more of a serial and/or parallel interface, a wireless interface, any type of network interface, a modem, and as any other type of communication interface. A wireless interface enables client device 500 to receive control input commands 506 and other information from an input device, such as from remote control device 508, a portable computing-based device (such as a cellular phone) 510, or from another infrared (IR), 802.11, Bluetooth, or similar RF input device.

A network interface provides a connection between the client device 500 and a communication network by which other electronic and computing devices can communicate data with device 500. Similarly, a serial and/or parallel interface provides for data communication directly between client device 500 and the other electronic or computing devices. A modem facilitates client device 500 communication with other electronic and computing devices via a conventional telephone line, a DSL connection, cable, and/or other type of connection.

Client device 500 also includes one or more processors 512 (e.g., any of microprocessors, controllers, and the like) which process various computer executable instructions to control the operation of device 500, to communicate with other electronic and computing devices, and to implement embodiments of modular grid display. Client device 500 can be implemented with computer readable media 514, such as one or more memory components, examples of which include random access memory (RAM), non-volatile memory (e.g., any one or more of a read-only memory (ROM), flash memory, EPROM, EEPROM; etc.), and a disk storage device. A disk storage device can include any type of magnetic or optical storage device, such as a hard disk drive, a recordable and/or rewriteable compact disc (CD), a DVD, a DVD+RW, and the like.

Computer readable media 514 provides data storage mechanisms to store various information and/or data such as software applications and any other types of information and data related to operational aspects of client device 500. For example, an operating system 516 and/or other application programs 518 can be maintained as software applications with the computer readable media 514 and executed on processor(s) 512 to implement embodiments of modular grid display. For example, an application program 518 can be implemented to determine the aspect ratio of an associated display device and adapt the display ratio of the grid elements for display accordingly.

Further, client device 500 can be implemented to include a program guide application 520 that is implemented to process program guide data 522 and generate program guides for display which enable a viewer to navigate through an onscreen display and locate broadcast programs, recorded programs, video on-demand programs and movies, interactive game selections, network-based applications, and other media access information or content of interest to the viewer.

The client device 500 can also include a DVR system 524 with playback application 526, and recording media 528 to maintain recorded media content 530 which may be any form of on-demand and/or media content such as programs, movies, commercials, music, and similar audio, video, and/or image content that client device 500 receives and/or records. Further, client device 500 may access or receive additional recorded media content that is maintained with a remote data store (not shown), such as from a video-on-demand server, or media content that is maintained at a broadcast center or content provider that distributes the media content to subscriber sites and client devices. The playback application 526 is a video control application that can be implemented to control the playback of media content, the recorded media content 530, and or other video on-demand media content, music, and any other audio, video, and/or image media content which can be rendered and/or displayed for viewing.

The client device 500 also includes an audio and/or video output 532 that provides audio and video to an audio rendering and/or display system 534, or to other devices that process, display, and/or otherwise render audio, video, and image data. Video signals and audio signals can be communicated from device 500 to a display device 536 via an RF (radio frequency) link, S-video link, composite video ink, component video link, analog audio connection, or other similar communication link. Alternatively, the audio rendering and/or display system 534 is/are integrated components of the example client device 500.

Figure 6:
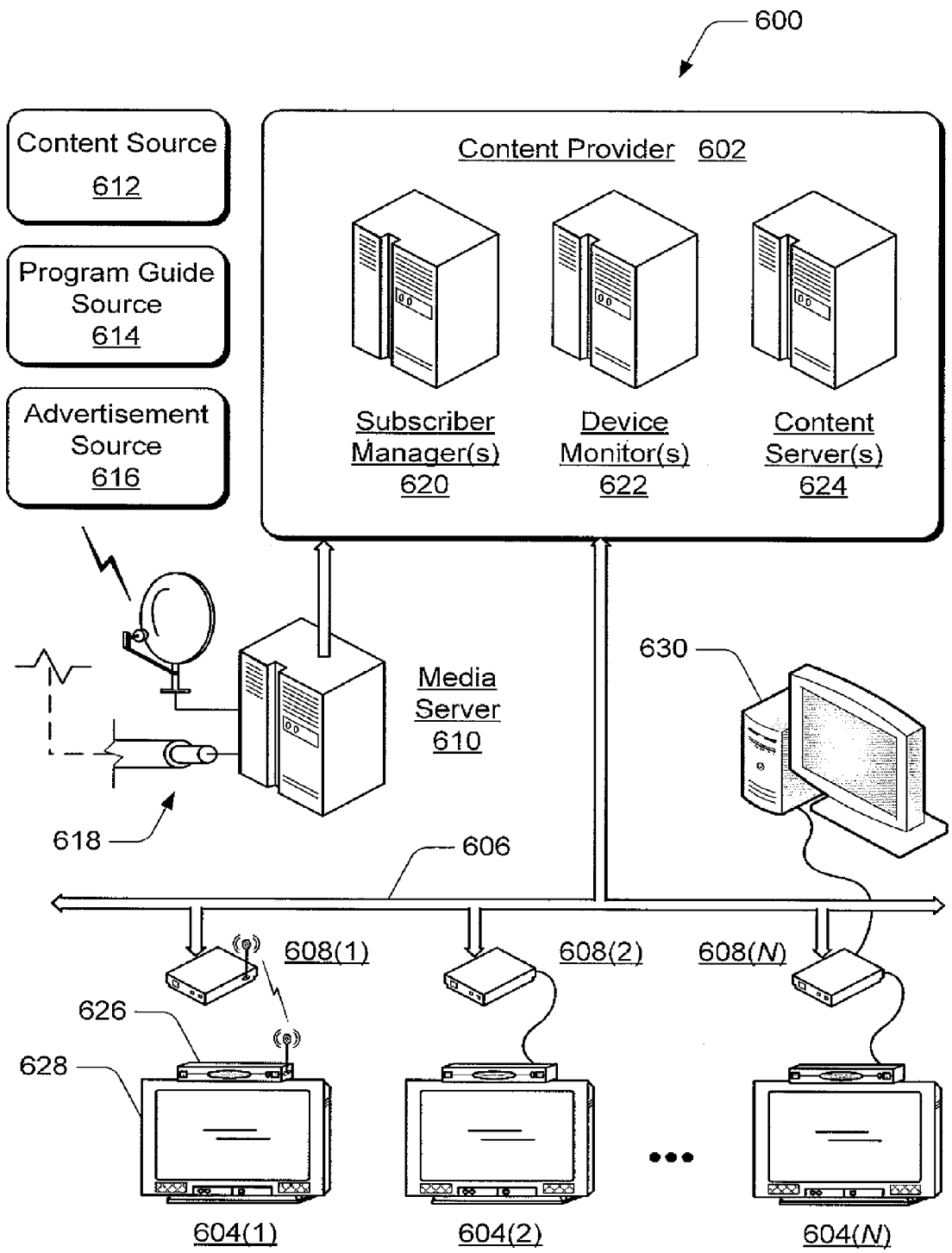
FIG. 6 illustrates various devices and components in an example entertainment and information system in which embodiments of modular grid display can be implemented.

FIG. 6 illustrates an example entertainment and information system 600 in which an IP-based television environment can be implemented, and in which embodiments of modular grid display can be implemented. System 600 facilitates the distribution of media content, program guide data, and advertising content to multiple viewers and to multiple viewing systems. System 600 includes a content provider 602 and client systems 604(1-N) each configured for communication via an IP-based network 606. Content provider 602 is an example of the content provider(s) 204 described with reference to FIG. 2, and each client system 604(1-N) is an example of the client systems 406(1-N) described with reference to FIG. 4. Each of the client systems 604(1-N) can receive one or more data streams from content provider 602 which are then distributed to one or more other client devices at DVR nodes of a multi-DVR system.

The network 606 can be implemented as a wide area network (e.g., the Internet), an intranet, a Digital Subscriber Line (DSL) network infrastructure, or as a point-to-point coupling infrastructure. Additionally, network 606 can be implemented using any type of network topology and any network communication protocol, and can be represented or otherwise implemented as a combination of two or more networks. A digital network can include various hardwired and/or wireless links 608(1-N), routers, gateways, and so on to facilitate communication between content provider 602 and the client systems 604(1-N). The client systems 604(1-N) receive media content, program content, program guide data, advertising content, closed captions data, and the like from content server(s) of the content provider 602 via the IP-based network 606.

System 600 includes a media server 610 that receives media content from a content source 612, program guide data from a program guide source 614, and advertising content from an advertisement source 616. In an embodiment, the media server 6510 represents an acquisition server that receives the audio and video media content from content source 612, an EPG server that receives the program guide data from program guide source 614, and/or an advertising management server that receives the advertising content from the advertisement source 616.

The content source 612, the program guide source 614, and the advertisement source 616 control distribution of the media content, the program guide data, and the advertising content to the media server 610 and/or to other servers. The media content, program guide data, and advertising content is distributed via various transmission media 618, such as satellite transmission, radio frequency transmission, cable transmission, and/or via any number of other wired or wireless transmission media. In this example, media server 610 is shown as an independent component of system 600 that communicates the program content, program guide data, and advertising content to content provider 602. In an alternate implementation, media server 610 can be implemented as a component of content provider 602.

Content provider 602 is representative of a headend service in a content distribution system, for example, that provides the media content, program guide data, and advertising content to multiple subscribers (e.g., the client systems 604(1-N)). The content provider 602 can be implemented as a satellite operator, a network television operator, a cable operator, and the like to control distribution of media content, program and advertising content, such as movies, television programs, commercials, music, and other audio, video, and/or image content to the client systems 604(1-N).

Content provider 602 includes various components to facilitate media data processing and content distribution, such as a subscriber manager 620, a device monitor 622, and a content server 624. The subscriber manager 620 manages subscriber data, and the device monitor 622 monitors the client systems 604(1-N) (e.g., and the subscribers), and maintains monitored client state information.

Although the various managers, servers, and monitors of content provider 602 (to include the media server 610 in one embodiment) are illustrated and described as distributed, independent components of content provider 602, any one or more of the managers, servers, and monitors can be implemented together as a multi-functional component of content provider 602. Additionally, any one or more of the managers, servers, and monitors described with reference to system 600 can implement features and embodiments of modular grid display.

The client systems 604(1-N) can be implemented to include a client device 626 and a display device 628 (e.g., a television, LCD, and the like). A client device 626 of a client system 604 can be implemented in any number of embodiments, such as a set-top box, a digital video recorder (DVR) and playback system, an appliance device, a gaming system, and as any other type of client device that may be implemented in a entertainment and information system. In an alternate embodiment, client system 604(N) is implemented with a computing device 630 as well as a client device 626. Additionally, any of the client devices 626 of a client system 604 can implement features and embodiments of modular grid display as described herein.

Although embodiments of modular grid display have been described in language specific to features and/or methods, it is to be understood that the subject of the appended claims is not necessarily limited to the specific features or methods described. Rather, the specific features and methods are disclosed as example implementations of modular grid display.

The invention claimed is:

1. A method, comprising:
    partitioning a modular grid into grid elements that each have a display ratio which is adaptable to correspond to different aspect ratios of respective display devices;
    receiving media content for display via a display device;
    determining an aspect ratio of the display device to adapt the display ratio of the grid elements to correspond to the aspect ratio of the display device; and
    selecting a grid segment of one or more of the grid elements to position the media content for display via the display device such that the media content displays at the aspect ratio of the display device within the grid segment.

2. A method as recited in claim 1, wherein the grid segment is selected to include all of the grid elements of the modular grid such that the media content displays full-screen on the display device.

3. A method as recited in claim 1, further comprising:
    receiving additional media content for display via the display device; and
    selecting an additional grid segment of the one or more grid elements to position the additional media content for display via the display device such that the additional media content is displayed proximate the media content, and such that the additional media content displays at the aspect ratio of the display device within the additional grid segment.

4. A method as recited in claim 3, wherein the additional media content is displayed proximate the media content to include at least one of: as a picture-in-picture; over at least a portion of the media content; adjacent the media content.

5. A method as recited in claim 1, wherein selecting the grid segment is performed by a client device that receives the media content.

6. A method as recited in claim 1, wherein selecting the grid segment is performed at a content provider, the method further comprising communicating the media content and selected grid segment to client devices that receive and render the media content for display.

7. A method as recited in claim 1, further comprising adapting the display ratio of the grid elements to correspond to the aspect ratio of the display device.

8. One or more computer readable media comprising computer executable instructions that, when executed, direct a client device to:
    generate a modular grid comprising grid elements that each have a display ratio which is adaptable to correspond to an aspect ratio of a display device via which media content can be displayed, one or more of the grid elements being selectable as a grid segment to position the media content for display;
    determine the aspect ratio of the display device;
    configure the display ratio of the grid elements to correspond the aspect ratio of the display device such that the media content displays at the aspect ratio of the display device.

9. One or more computer readable media as recited in claim 8, further comprising computer executable instructions that, when executed, direct the client device to configure the display ratio of the grid elements to correspond to a different aspect ratio of an additional display device such that the media content displays at the different aspect ratio of the additional display device.

10. One or more computer readable media as recited in claim 8, further comprising computer executable instructions that, when executed, direct the client device to receive additional media content for display via the grid segment of selected one or more grid elements, where the grid segment positions the additional media content for display proximate the media content, and such that the additional media content displays at the aspect ratio of the display device within the grid segment.

11. One or more computer readable media as recited in claim 10, further comprising computer executable instructions that, when executed, direct the client device to generate the display of the additional media content proximate the media content to include at least one of: as a picture-in-picture; over at least a portion of the media content; adjacent the media content.

12. One or more computer readable media as recited in claim 8, further comprising computer executable instructions that, when executed, direct the client device to receive the grid segment as selected by a content provider of the media content that communicates the media content to the client device.

13. One or more computer readable media as recited in claim 8, further comprising computer executable instructions that, when executed, direct the client device to select the grid segment in which the media content is rendered for display via the display device.

14. One or more computer readable media as recited in claim 8, further comprising computer executable instructions that, when executed, direct the client device to receive the grid segment as selected by a media content designer to position the media content for display via the display device such that the media content displays at the aspect ratio of the display device within the grid segment.

15. A modular grid display system, comprising:
- a programmed application configured to generate a modular grid of grid elements that each have a display ratio which is adaptable to correspond to different aspect ratios of respective display devices via which media content can be displayed; and
- a client device configured to receive the media content and render the media content for display such that the media content displays at the aspect ratio of a display device within a selected grid segment that includes one or more of the grid elements.

16. A modular grid display system as recited in claim 15, further comprising a content provider of the media content, the content provider configured to select the grid segment of the one or more grid elements to position the media content for display.

17. A modular grid display system as recited in claim 15, wherein the client device is further configured to determine the aspect ratio of the display device to adapt the display ratio of the grid elements to correspond to the aspect ratio of the display device.

18. A modular grid display system as recited in claim 15, wherein the client device is further configured to receive the media content and select the grid segment of the one or more grid elements to position the media content for display via the display device.

19. A modular grid display system as recited in claim 18, wherein the client device is further configured to:
- receive additional media content for display via the display device; and
- select an additional grid segment of the one or more grid elements to position the additional media content for display via the display device such that the additional media content is displayed proximate the media content, and such that the additional media content displays at the aspect ratio of the display device within the additional grid segment.

20. A modular grid display system as recited in claim 19, wherein the additional media content is displayed proximate the media content to include at least one of: as a picture-in-picture; over at least a portion of the media content; adjacent the media content.

* * * * *